(12) United States Patent
Kane et al.

(10) Patent No.: US 7,039,076 B2
(45) Date of Patent: May 2, 2006

(54) FIBER AMPLIFIER SYSTEM FOR PRODUCING VISIBLE LIGHT

(75) Inventors: Thomas J. Kane, Menlo Park, CA (US); Gregory L. Keaton, San Francisco, CA (US); James J. Morehead, Oakland, CA (US)

(73) Assignee: JDS Uniphase Corporation, San Jose, CA (US)

( * ) Notice: Subject to any disclaimer, the term of this patent is extended or adjusted under 35 U.S.C. 154(b) by 335 days.

(21) Appl. No.: 10/662,097

(22) Filed: Sep. 12, 2003

(65) Prior Publication Data

US 2004/0052278 A1 Mar. 18, 2004

Related U.S. Application Data

(63) Continuation-in-part of application No. 09/927,145, filed on Aug. 10, 2001, now abandoned.

(51) Int. Cl.
*H01S 3/30* (2006.01)
(52) U.S. Cl. ............................................. 372/6; 372/25
(58) Field of Classification Search ................. 372/25, 372/6; 385/123
See application file for complete search history.

(56) References Cited

U.S. PATENT DOCUMENTS

| | | | |
|---|---|---|---|
| 4,708,421 A | 11/1987 | Desruvire | 385/30 |
| 4,734,911 A | 3/1988 | Bruesselbach | 372/21 |
| 4,796,262 A | 1/1989 | Michelangeli et al. | 372/9 |
| 4,815,804 A | 3/1989 | Desruvire | 385/27 |
| 4,952,059 A | 8/1990 | Desruvire | 356/461 |
| 5,162,940 A | 11/1992 | Brandelik | 359/333 |
| 5,200,964 A | 4/1993 | Huber | 372/26 |
| 5,239,408 A | 8/1993 | Hackel et al. | 359/338 |
| 5,295,209 A | 3/1994 | Huber | 385/37 |
| 5,388,114 A | 2/1995 | Zarrabi | 372/22 |
| 5,400,165 A | 3/1995 | Gnauck et al. | 398/160 |
| 5,434,875 A | 7/1995 | Rieger et al. | 372/25 |

(Continued)

OTHER PUBLICATIONS

Fabio Di Teodoro, Jeffrey P. Koplow, Sean W. Moore and Dahv A. V. Kliner, "Diffraction-limited 300-kW peak-power pulses from a coiled multimode fiber amplifier," *Optics Letters*, vol. 27, No. 7, Apr. 1, 2002.

(Continued)

*Primary Examiner*—Minsun Oh Harvey
*Assistant Examiner*—Tuan N. Nguyen
(74) *Attorney, Agent, or Firm*—Allen, Dyer, Doppelt, Milbrath & Gilchrist, P.A.

(57) ABSTRACT

A light source is disclosed having a pulsed laser, a fiber amplifier optically coupled to the pulsed laser, and a nonlinear frequency converting element optically coupled to the fiber amplifier. The pulsed laser, e.g., a passively Q-switched laser, is configured to generate light pulses characterized by a pulse length of less than about 1.7 nsec and sufficiently large that a frequency bandwidth of the pulses after they emerge from the fiber amplifier is less than an acceptance bandwidth of the nonlinear frequency converting element. The laser is pulsed at a pulse repetition rate sufficiently large that the fiber amplifier does not spontaneously emit radiation between pulses. In such a source, the fiber amplifier is substantially free of stimulated Brillouin scattering and self-phase modulation may be held to a level that does not reduce conversion of infrared radiation to visible radiation. Such a light source can be combined with an image generator and a scanner in an image projection system.

29 Claims, 8 Drawing Sheets

U.S. PATENT DOCUMENTS

| | | | |
|---|---|---|---|
| 5,461,637 A | 10/1995 | Mooradian et al. ............ 372/92 |
| 5,491,707 A | 2/1996 | Rieger et al. ................. 372/25 |
| 5,511,085 A | 4/1996 | Marshall ...................... 372/22 |
| 5,539,765 A | 7/1996 | Sibbett et al. ................ 372/92 |
| 5,541,947 A | 7/1996 | Mourou et al. ............... 372/25 |
| 5,627,853 A | 5/1997 | Mooradian et al. ........... 372/92 |
| 5,648,976 A | 7/1997 | Franck et al. ................. 372/25 |
| 5,675,596 A | 10/1997 | Kong et al. .................... 372/25 |
| 5,680,412 A | 10/1997 | DeMaria et al. .............. 372/92 |
| 5,689,363 A | 11/1997 | Dane et al. .................. 359/335 |
| 5,751,751 A | 5/1998 | Hargis et al. ................. 372/41 |
| 5,768,302 A | 6/1998 | Wallace et al. ............... 372/21 |
| 5,790,574 A | 8/1998 | Rieger et al. ................. 372/25 |
| 5,790,584 A | 8/1998 | Kong et al. .................... 372/98 |
| 5,822,489 A * | 10/1998 | Hale ........................... 385/145 |
| 5,825,465 A | 10/1998 | Nerin et al. ................ 356/28.5 |
| 5,889,798 A | 3/1999 | Molva et al. .................. 372/12 |
| 5,920,588 A | 7/1999 | Watanabe ..................... 372/96 |
| 5,949,941 A * | 9/1999 | DiGiovanni ................ 385/127 |
| 5,982,482 A | 11/1999 | Nelson et al. .............. 356/237.1 |
| 5,982,789 A | 11/1999 | Marshall et al. .............. 372/22 |
| 5,986,234 A | 11/1999 | Matthews et al. ..... 219/121.68 |
| 6,026,102 A | 2/2000 | Shimoji ........................ 372/22 |
| 6,096,496 A | 8/2000 | Frankel ........................... 435/5 |
| 6,100,516 A | 8/2000 | Nerin et al. ............. 250/260.2 |
| 6,141,143 A | 10/2000 | Marshall ...................... 359/342 |
| 6,144,484 A | 11/2000 | Marshall ...................... 359/333 |
| 6,195,369 B1 | 2/2001 | Kumar et al. ................. 372/26 |
| 6,208,458 B1 | 3/2001 | Galvanauskas et al. ..... 359/345 |
| 6,249,638 B1 * | 6/2001 | Hale ........................... 385/145 |
| 6,301,275 B1 | 10/2001 | Eichenholz et al. .......... 372/22 |
| 6,307,984 B1 | 10/2001 | Watanabe ..................... 385/24 |
| 6,393,035 B1 | 5/2002 | Weingarten et al. .......... 372/18 |
| 6,449,408 B1 | 9/2002 | Evans et al. .................. 385/27 |
| 6,504,972 B1 | 1/2003 | Watanabe ..................... 385/24 |
| 6,506,342 B1 | 1/2003 | Frankel ........................ 422/63 |
| 6,542,228 B1 | 4/2003 | Hartog ...................... 356/73.1 |
| 6,563,995 B1 | 5/2003 | Keaton et al. .............. 385/127 |
| 6,577,429 B1 | 6/2003 | Kurtz et al. ................. 359/279 |
| 6,614,815 B1 | 9/2003 | Kane et al. | |
| 6,710,914 B1 * | 3/2004 | Arbore et al. .............. 359/330 |
| 6,731,660 B1 * | 5/2004 | Arbore et al. ................. 372/20 |
| 2001/0017724 A1 | 8/2001 | Miyamoto et al. .......... 398/135 |
| 2001/0021288 A1 | 9/2001 | Watanabe ..................... 385/15 |
| 2001/0053263 A1 | 12/2001 | Watanabe ..................... 385/24 |
| 2002/0018630 A1 | 2/2002 | Richardson et al. ........ 385/127 |
| 2002/0030881 A1 | 3/2002 | Nilsson et al. ........... 359/341.1 |
| 2002/0136246 A1 | 9/2002 | Kubota et al. ................. 372/21 |
| 2003/0030756 A1 | 2/2003 | Kane et al. .................. 348/744 |
| 2003/0031215 A1 | 2/2003 | Kane et al. .................... 372/10 |
| 2003/0031411 A1 | 2/2003 | Arbore et al. ................ 385/37 |
| 2003/0058904 A1 | 3/2003 | Krainer et al. ................ 372/25 |
| 2003/0063860 A1 | 4/2003 | Watanabe ..................... 385/39 |
| 2003/0118060 A1 | 6/2003 | Spuehler et al. .............. 372/18 |

OTHER PUBLICATIONS

Dahv A. V. Kliner Fabio Di Teodoro, Jeffrey P. Koplow, and Sean W. Moore, "Efficient UV and visible generation using a pulsed, Yb-doped fiber amplifier," presented at Conference of Lasers and Electro-Optics, May 23, 2002.

G. J. Spuhler, R. Paschotta, R. Fluck, B. Braun, M. Moser, G. Zhang, E. Gini and U. Keller, "Experimentally confirmed design guidelines for passively Q-switched microchip lasers using semiconductor saturable absorbers," Journal of the Optical Society of America B, vol. 16, No. 4, Mar. 1999.

Govind P. Agrawal, *Nonlinear Fiber Optics, Third Edition*, Chapter 9, Stimulated Brillouin Scattering, pp. 355-388, Academic Press, San Diego, California, 2001.

R. Selvas, J. K. Sahu, L. B. Fu, J. N. Jang, J. Nilsson, A. B. Grudinin, K. H. Yla-Jarkko, S. A., Alam, P. W. Turner and J. Moore, "High-power, low-noise, Yb-doped, cladding-pumped, three-level fiber sources at 980 nm," *Optics Letters*, vol. 28, No. 13, Jul. 1, 2003.

* cited by examiner

FIBER AMPLIFIER SYSTEM FOR PRODUCING VISIBLE LIGHT

CROSS-REFERENCE TO A RELATED APPLICATION

This application is a continuation in part of commonly assigned U.S. patent application Ser. No. 09/927,145 to Thomas Kane and Mark Arbore, entitled "COMPOUND LIGHT SOURCE EMPLOYING PASSIVE Q-SWITCHING AND NONLINEAR FREQUENCY CONVERSION, filed Aug. 10, 2001," now abandoned the disclosures of which are incorporated herein by reference. This application is also related to commonly-assigned U.S. patent application Ser. No. 10/662,086 to Thomas J. Kane entitled "HIGH REPETITION RATE PASSIVELY Q-SWITCHED LASER FOR BLUE LASER BASED ON INTERACTIONS IN FIBER," which is filed concurrently herewith and the disclosures of which are incorporated herein by reference.

GOVERNMENT RIGHTS IN THE INVENTION

This invention was made under contract # F29601-01-C-0246 of the United States Air Force.
The government has certain rights in this invention.

FIELD OF THE INVENTION

The present invention relates generally to compound light sources employing lasers with passive Q-switches and non-linear frequency converters to generate light in a desired wavelength range.

BACKGROUND OF THE INVENTION

Many applications require reliable, stable and efficient spectrally-pure high-power light sources. For example, image projection systems require light sources which exhibit these characteristics and deliver in excess of 1 Watt average power. These light sources should be inexpensive to produce and they need to generate output frequencies in the blue range and in the green range. For other applications light in the UV range is required.

The prior art teaches various types of light sources for generating light in the visible and UV ranges, including frequencies corresponding to blue and green light. A number of these sources rely on a nonlinear frequency conversion operation such as second harmonic generation (SHG) to transform a frequency outside the visible range, e.g., in the IR range, to the desired visible or UV frequency. For example, U.S. Pat. No. 5,751,751 to Hargis et al. teaches the use of SHG to produce deep blue light. Specifically, Hargis et al. use a microlaser which has a rare earth doped microlaser crystal and emits light at about 914 nm to drive SHG in a crystal of BBO producing output at about 457 nm.

U.S. Pat. No. 5,483,546 to Johnson et al. teaches a sensing system for high sensitivity spectroscopic measurements. This system uses a passively Q-switched laser emitting light at a first frequency. The light from the laser is transmitted through a fiber and converted to output light at a second frequency in the UV range. The conversion is performed by two frequency doubling crystals disposed far away from the Q-switched laser.

U.S. Pat. No. 6,185,236 to Eichenholz et al. teaches a self frequency doubled Nd:doped YCOB laser. The laser generates light of about 400 mW power at about 1060 nm and frequency doubles it with the aid of a frequency doubling oxyborate crystal to output light in the green range at about 530 nm. Eichenholz et al. combine the active gain medium and the frequency doubler in one single element to produce a compact and efficient light source.

In U.S. Pat. No. 5,909,306 Goldberg et al. teach a solid-state spectrally pure pulsed fiber amplifier laser system for generating UV light. This system has a fiber amplifier in a resonant cavity and an acousto-optic or electro-optic modulator incorporated into the cavity for extracting high-peak-power, short-duration pulses from the cavity. These short pulses are then frequency converted in several non-linear frequency conversion crystals (frequency doubling crystals). The addition of the modulator into the cavity for extracting the pulses and placement of the fiber amplifier within the resonant cavity renders this system very stable and capable of delivering a spectrally-pure pulse. Unfortunately, this also makes the system too cumbersome and expensive for many practical applications such as display systems.

U.S. Pat. No. 5,740,190 to Moulton teaches a three-color coherent light system adapted for image display purposes. This system employs a laser source and a frequency doubling crystal to generate green light at 523.5 nm. Moulton's system also generates blue light at 455 nm and red light at 618 nm by relying on frequency doubling and the nonlinear process of optical parametric oscillation.

Unfortunately, the light sources described above and various other types of light sources taught by the prior art can not be employed to make stable, low-cost, efficient sources of light delivering 1 Watt of average power for display applications. This is in part due to the fact that frequency conversion, e.g., frequency doubling in crystals, is not a very efficient operation. If the frequency doubling crystal had extremely high non-linearity, then low power continuous wave (cw) lasers could be efficiently doubled to generate output power levels near 1 Watt. However, in the absence of such frequency doubling crystals high-peak-power, short pulse lasers have to be used to obtain frequency doubled light at appreciable power levels. It should also be noted that providing such high-peak-power short pulses adds complexity to the design of the light sources and introduces additional costs.

U.S. Pat. No. 5,394,413 to Zayhowski addresses the issue of efficient frequency doubling by using a passively Q-switched picosecond microlaser to deliver the pulses of light. Such pulses can be efficiently converted, as further taught by Zayhowski in a frequency-doubling crystal. Devices built according to Zayhowski's teaching operate at relatively low average power levels and low repetition rates. Attempts to increase these parameters by pumping the microchip harder will cause multiple transverse-mode operation leading to degradation of beam quality and also incur increased pulse-to-pulse noise. Hence, Zayhowski's devices can not be used in applications such as projection displays, which require high average power and high repetition rates and good beam quality.

Hence, what is needed is a stable and efficient source of light in the blue and green ranges which can be used in a projection display.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. In the mathematical derivations described below certain assumptions have been made for the sake of clarity. These assumptions should not be construed as limitations on the invention. Accordingly, the embodiments of the invention described below are set forth without any loss of generality to, and without imposing limitations upon, the claimed invention.

In embodiments of the present invention, a pulsed laser, preferably a passively Q-switched laser (PQSL) launches a signal into a fiber amplifier. The pulsed laser generates pulses of width less than about 1.7 nsec. The pulse length can be greater than about 100 psec and the repetition rate can be greater than about 100 kHz. The fiber amplifier has a pump guide for receiving pump light (preferably from diode lasers), and embedded within this pump guide is a core. In some, but not all, embodiments of the invention, the core includes a depressed cladding. The light from the Q-switched laser is coupled to the core of the fiber, and is amplified by the fiber. The amplified light then leaves the fiber and enters a nonlinear frequency-converting element, preferably comprising one or more nonlinear crystals such as lithium borate (LBO). The resulting frequency-converted light is the desired, generally visible light. Embodiments of the present invention are free of stimulated Brillouin scattering (SBS) and have levels of self-phase modulation that does not reduce frequency conversion to the visible.

I. Fiber Amplifier System

Figure 1:
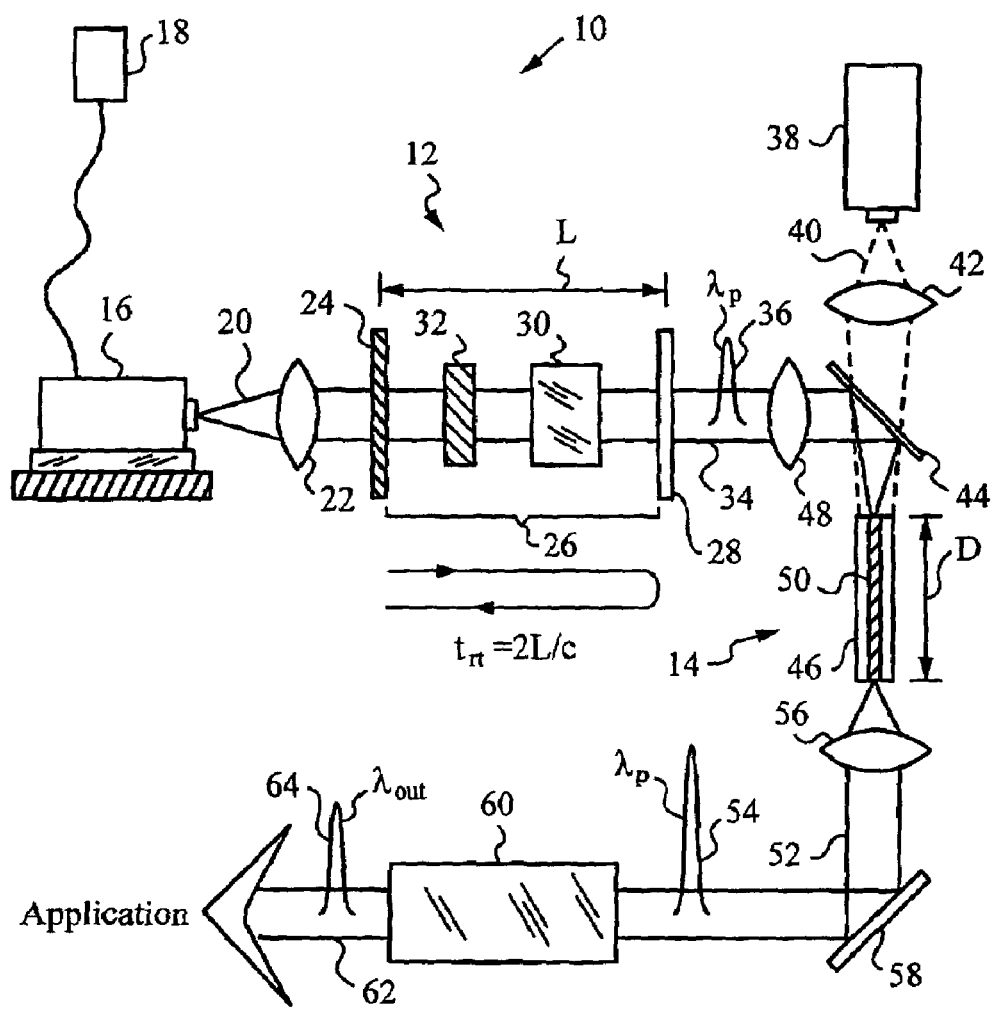
FIG. 1 is a diagram of a light source according to the invention.

FIG. 1 illustrates a fiber amplifier system 10 according to an embodiment of the invention. The fiber amplifier system 10 has a passively Q-switched laser (PQSL) 12, a fiber amplifier 14 and a nonlinear frequency converting element 60. The PQSL 12 generates a primary beam 34 of primary pulses 36. The primary pulses have a pulse length less than about 1.7 nsec and sufficiently large to facilitate frequency conversion in the nonlinear element 60, e.g., greater than about 100 psec. The PQSL 12 preferably produces the pulses at a sufficiently large repetition rate, e.g., greater than about 100 kHz. The fiber amplifier system 10 can also have a PQSL pump source 16 for producing PQSL pump light 20 that pumps the PQSL 12. In this embodiment, the PQSL pump source 16 is a laser equipped with a wavelength tuning mechanism 18. Such a laser can be designed to deliver PQSL pump light 20 in the form of a continuous wave (cw) light beam. Many types of lasers are suitable for use as the PQSL pump source 16. For example, diode lasers emitting PQSL pump light 20 within the 750 nm to 1100 nm range can be used. The power level of these diode lasers can be between 100 mW and 4000 mW.

A lens 22 is provided before PQSL pump source 16 for focusing pump light 20 and directing it to an input coupler 24 of Q-switched laser 12. Input coupler 24 is designed to admit pump light 20 into a cavity 26 of passively Q-switched laser 12. Cavity 26 has an optical path length L defined between input coupler 24 and an output coupler 28. Although in the present embodiment cavity 26 is linear and couplers 24, 28 are in the form of mirrors, a person skilled in the art will appreciate that other types of cavities and coupling elements can be used, see e.g., commonly-assigned U.S. patent application Ser. No. 10/662,086, which has been incorporated herein by reference.

Cavity 26 contains a gain medium 30. Gain medium 30 exhibits a high amount of gain per unit length when pumped with PQSL pump light 20. Typically, high gain is achieved by providing a high doping level in gain medium 30 within the cross section traversed by light 20. Doped materials with suitable amounts of gain to be used as gain medium 30 include Yb:YAG at the 1030 nm and 980 nm transitions, Nd:Vanadate at the 880 nm, 914 nm, and 1064 nm transitions and Nd:YAG at the 946 nm and 1064 nm transitions. A person skilled in the art will be familiar with other suitable materials and the corresponding transitions. Some of these materials include Yb Glass Fiber (980 nm transition), Yb Glass Fiber (1020–1120 nm transition), Nd Glass Fiber (880–940 nm transition), and Nd Glass Fiber (1050–1090 nm transition).

Cavity 26 also contains a passive variable loss element or passive Q-switch 32. Preferably, passive Q-switch 32 is a saturable absorber Q-switch such as chromium:YAG, which functions in the wavelength range from 860 nm to 1100 nm. Alternatively, semiconductors or semiconductor material structured to act as a mirror can be used as passive Q-switch 32. Passive Q-switch 32 is adjusted for switching on and off such that, when subjected to cw pumping by PQSL pump light 20, passively Q-switched laser 12 generates a pulsed primary beam 34 at a primary wavelength $\lambda_p$. For clarity, only a single primary pulse 36 of primary beam 34 exiting cavity 26 through output coupler 28 is indicated in FIG. 1. Primary wavelength $\lambda_p$ corresponds to the selected transition of gain medium 30. This transition can be selected in any suitable range. By way of example, the transitions are selected in a wavelength range between 860 nm and 1100 nm.

The fiber amplifier system 10 also has a fiber pump source 38 for supplying a fiber pump light 40 to the fiber amplifier 14. The fiber pump source 38 can be a diode laser operating in the wavelength range from 750 to 1000 nm and delivering between 1 and 100 Watts of power. Preferably, fiber pump source 38 is fiber coupled laser such as a LIMO type laser (available from LIMO Laser Systems, of Dortmund, Germany). A lens 42 and a beam combiner 44 are positioned in the path of the fiber pump light 40. Lens 42 focuses the fiber pump light 40 such that it is in-coupled into the fiber amplifier 14. In particular, with the aid of lens 42 the fiber pump light 40 is in-coupled into a cladding 46 of the fiber amplifier 14. A lens 48 is also positioned in the path of primary beam 34 before beam combiner 44. Lens 48 focuses primary beam 34 such that after being combined with the fiber pump light 40 by beam combiner 44, primary beam 34 is in-coupled into a core 50 of the fiber amplifier 14.

The fiber amplifier 14 produces a pulsed intermediate beam 52 at primary wavelength $\lambda_p$ from primary beam 34. Preferably, pulsed intermediate beam 52 exhibits high peak power, e.g., in the range of a few thousand Watts in each pulse 54 (only one pulse shown for reasons of clarity). To achieve such high peak power fiber amplifier 14 has a short length D, e.g., D is on the order of a few meters, so as to suppress stimulated Raman scattering (SRS). One working example of a system like system 10 had a fiber with a length D of about 5 meters and a peak pulse power of about 4 kW. In addition, to achieve efficient absorption of the fiber pump light 40 in core 50 over such short length D, cladding 46 is preferably small, e.g., between 100 μm and 200 μm in diameter or smaller. For example, air-clad fibers can have pump claddings about 40 μm in diameter. Furthermore, core 50 is preferably large, e.g., between 5 μm and 10 μm mean diameter, and exhibits a high doping level, e.g., 0.5% or more. A person skilled in the art will be able to select the appropriate dopant for doping core 50 to amplify primary beam 34 based on primary wavelength $\lambda_p$. Suitable doping ions when primary wavelength $\lambda_p$ is in the green range are Ytterbium ions while Neodymium ions can be used for amplifying primary beam 34 when its light is in the green or blue range.

A lens 56 and a beam guiding element 58, in this case a mirror, are positioned in the path of pulsed intermediate beam 52. Lens 56 shapes pulsed intermediate beam 52 and element 58 deflects it such that beam 52 is in-coupled into the nonlinear element 60. Nonlinear element 60 is selected for its ability to frequency convert pulses 54 of pulsed intermediate beam 52 in a single pass to produce a pulsed output beam 62 at an output wavelength $\lambda_{out}$. Only one pulse 64 of output beam 62 is illustrated for clarity.

In the present embodiment, nonlinear element 60 consists of a single nonlinear optical crystal capable of converting primary wavelength $\lambda_p$ to output wavelength $\lambda_{out}$ in the UV, green or blue range. The conversion process is second harmonic generation (SHG) and is well-known in the art. SHG doubles the frequency of intermediate beam 52, or, equivalently, halves primary wavelength $\lambda_p$ such that $2\lambda_{out} = \lambda_p$. Hence, when primary wavelength $\lambda_p$ is in the range from 860 nm to 1100 nm output wavelength $\lambda_{out}$ will be in the range from 430 nm to 550 nm.

Preferably, the optical crystal used as nonlinear element 60 is a borate crystal. More preferably, the optical crystal is a lithium borate (LBO) or barium borate (BBO) crystal. Also, although only one crystal is employed as nonlinear element 60 in the present embodiment, several can be used, as will be appreciated by those skilled in the art. In addition, any appropriate phase matching technique known in the art is employed to ensure efficient SHG in nonlinear element 60.

During operation, pump source 16 is tuned by mechanism 18 to generate pump light 20 in the form of a cw beam at the requisite wavelength to pump gain medium 30. Passively Q-switched laser 12 is adjusted such that primary pulses 36 of primary beam 34 are controlled. To achieve this, one notes that a round-trip time, $t_{rt}$, of cavity 26 is related to the optical path length L of cavity 26 by the equation:

$$t_n = \frac{2L}{c}$$

where c is the speed of light. Hence, round-trip time $t_{rt}$ can be set by selecting optical path length L of cavity 26. The optical path length L takes into account the indices of refraction of the components that make up the cavity.

Meanwhile, passive Q-switch 32, (e.g., a saturable absorber Q-switch) is adjusted by setting its inter-pulse time. This is done by choosing the appropriate saturable loss, $q_o$, of the absorbing material and using the fact that the repetition rate of passive Q-switch 32 is proportional to pump power or the power level of pump light 20, and that increasing the repetition rate produces longer primary pulses 36. These parameters can be adjusted to obtain the appropriate inter-pulse time; for more information see, e.g., G. J. Spuhler et al., "Experimentally Confirmed Design Guidelines for Passively Q-Switched Microchip Lasers Using Semiconductor Saturable Absorbers", J. Opt. Soc. Am. B, Vol. 16, No. 3, March 1999, pp. 376–388 (hereinafter Spuhler), which is incorporated herein by reference. Although Spuhler provides adequate guidelines for PQSL systems providing 1064-nm output, PQSL systems that produce 914-nm radiation, e.g., those using Nd:YVO$_4$ as the gain medium 30, present much greater problems. Solutions to these problems are addressed in commonly-assigned, co-pending U.S. patent application Ser. No. 10/662,086, which has been incorporated herein by reference.

Figure 2:
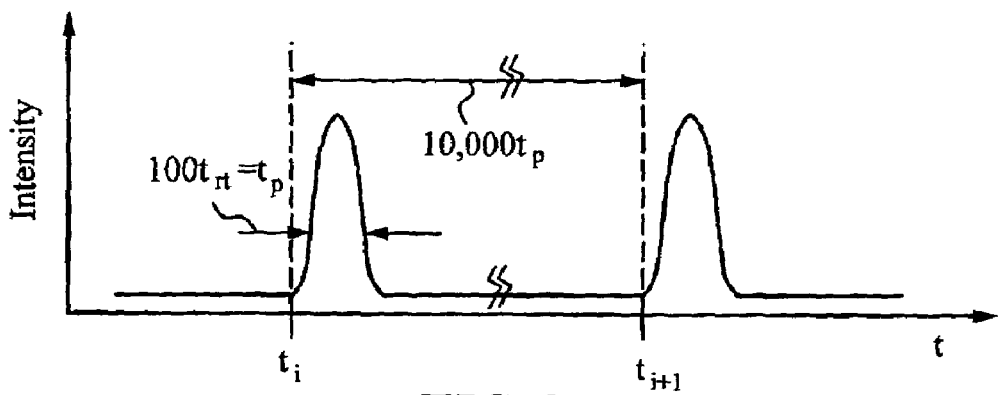
FIG. 2 is a timing diagram illustrating pulse timing in the light source of FIG. 1.

In a preferred embodiment, optical path length L is very short, e.g., L is on the order of 10 millimeters or less. Preferably, L is even less than 1 millimeter. The inter-pulse time of passive Q-switch 32 is selected such that primary pulses 36 have a pulse duration $t_p$ of about 100 times round-trip time $t_{rt}$ as illustrated in FIG. 2. In addition, passive Q-switch 32 is also set such that the time between successive primary pulses 36 at times $t_i$ and $t_{i+1}$ defining an interpulse separation is at least 100 times pulse time $t_p$ and preferably up to 10,000 times pulse time $t_p$. Thus, in the preferred embodiment, primary pulses 36 have a duty cycle ranging from 0.01% to 1%.

Primary pulses 36 exiting passively Q-switched laser 12 should preferably have a peak power level of at least 10 Watts and preferably between 50 and 500 Watts. When primary pulses 36 enter fiber amplifier 14, which has a gain of about 100 or more (e.g., between 50 and 500) they are amplified to form intermediate pulses 54 with over 1,000 Watts and preferably over 10,000 Watts of peak power while preserving primary pulse timing as described above. At this power level and timing, intermediate pulses 54 have a pulse format which is above a nominal nonlinear frequency conversion threshold for SHG in nonlinear element 60. Specifically, for the purposes of this description, nominal nonlinear frequency conversion threshold is defined to correspond to a pulse conversion efficiency of at least 10%. Preferably, the conversion efficiency is close to 50% or even higher. Now, at 10,000 Watts of peak power intermediate pulses 54 exhibit approximately 50% efficient conversion to output pulses 64 in LBO or BBO crystals of 20 mm length.

By operating fiber amplifier system 10 as described above it is possible to obtain output beam 62 with output pulses 64 in the wavelength range from 430 nm to 550 nm at up to 5,000 Watts of peak power with a duty cycle between 0.01% and 1%. The actual application for which the fiber amplifier system 10 is used will determine the exact peak power requirements for output pulses 64 and the required output wavelength $\lambda_{out}$.

Figure 3A:
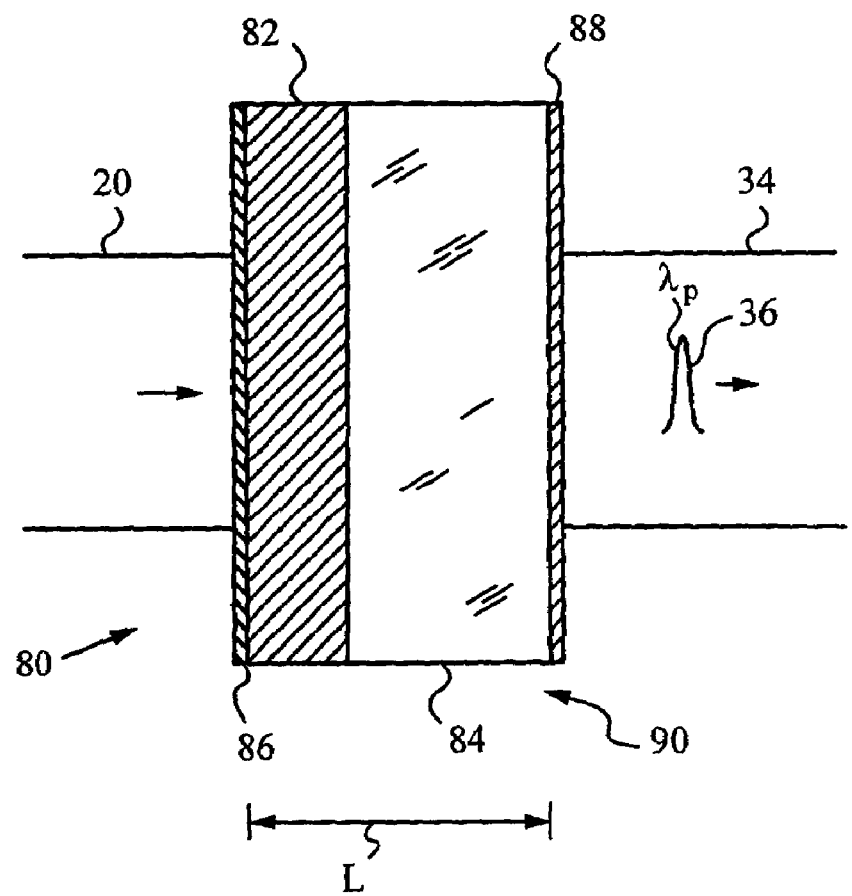
FIG. 3A is a detailed cross sectional view of a particular Q-switched laser suitable for use in a light source according to the invention.

The fiber amplifier system 10 is a compound source with a number of elements requiring proper alignment and positioning. Several components of the fiber amplifier system 10 can be simplified to reduce the complexity and cost of the fiber amplifier system 10. FIG. 3A illustrates a preferred embodiment of a passively Q-switched laser 80 for the fiber amplifier system 10. Laser 80 consists of a thin plate of saturable absorber 82 serving as the passive Q-switch and of a thin plate of gain medium 84. Saturable absorber 82 is bonded or otherwise attached to gain medium 84. It is also possible to align the plates of saturable absorber 82 and gain medium 84 in parallel and in close proximity. In this event the facing surfaces of the plates should be coated for low reflection.

Figure 3B:
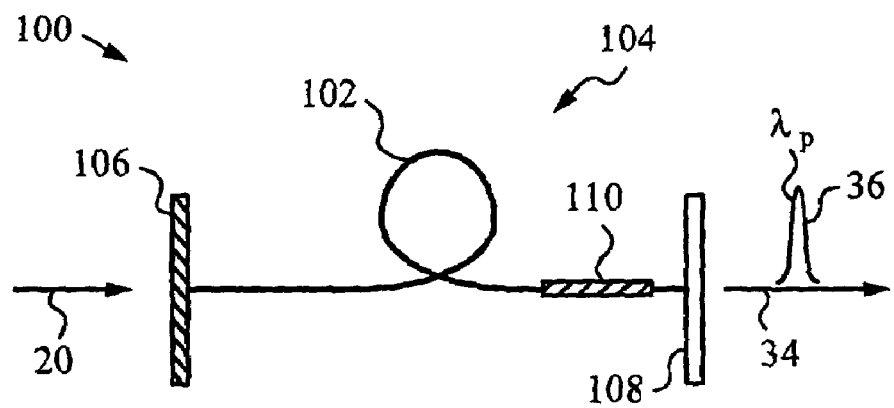
FIG. 3B is a diagram of another Q-switched laser suitable for use in a light source according to the invention.

A first mirror 86 and a second mirror 88 are deposited directly on the external surfaces of the plates of saturable absorber 82 and gain medium 84. First mirror 86 is an input coupler and admits pump light 20 into laser 80. Second mirror 88 is an output coupler, and serves for coupling out primary pulses 36 of pulsed primary beam 34. Mirrors 86 and 88 define a resonant cavity 90 of length L, which is short, e.g., on the order of 1 mm or less. Laser 80 is sometimes referred to as a microchip laser in the art. For further information on design guidelines for microchip lasers the reader is again referred to G. J. Spuhler et al., "Experimentally Confirmed Design Guidelines for Passively Q-Switched Microchip Lasers Using Semiconductor Saturable Absorbers", J. Opt. Soc. Am. B, Vol. 16, No. 3, March 1999, pp. 376–388. FIG. 3B illustrates another embodiment of a passively Q-switched laser 100 for the fiber amplifier system 10. Laser 100 has a gain fiber 102 disposed in a resonant cavity 104. Resonant cavity 104 is defined between a mirror 106 for in-coupling pump light 20 and a mirror 108 for out-coupling pulsed primary beam 34. Although cavity 104 is defined by mirrors 106, 108 in this case, gratings or coatings placed near the end of gain fiber 102 could also be used to define cavity 104. In fact, sometimes only one grating or coating can be used and the other end of gain fiber 102 can be cleaved to obtain Fresnel reflection from the cleaved surface. A person skilled in the art will appreciate how to process gain fiber 102 to establish cavity 104.

Gain fiber 102 is doped with gain material, as is known in the art. A saturable loss absorber 110 serving as passive Q-switch is spliced with gain fiber 102. Alternatively, saturable loss absorber 110 can be a segment of fiber doped with the saturable absorber material or it can even be a separate segment of fiber placed between the end of gain fiber 102 and mirror 108.

Figure 4A:
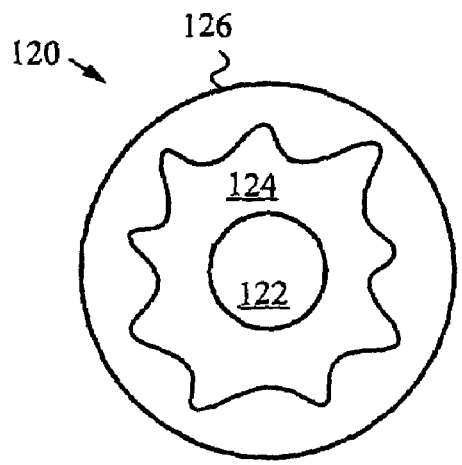
FIGS. 4A&B are cross sectional views of fiber amplifiers suitable for use in a light source of the invention.

FIG. 4A illustrates in cross section a fiber amplifier 120 which can be used by the fiber amplifier system 10. Fiber amplifier 120 has an active, circular core 122 surrounded by a cladding 124 with an irregular cross section. Core 122 is preferably a single-mode core. A protective outer cladding 126 surrounds cladding 124. The fiber pump light 40 is in-coupled into cladding 124, while primary beam 34 is in-coupled into core 122, as described above. Because of the irregular cross section of cladding 124, pump light 40 is efficiently delivered to core 122 for amplifying primary beam 34. Thus, the length of fiber amplifier 120 can be kept short, e.g., 2 meters or less, as indicated above.

Figure 4B:
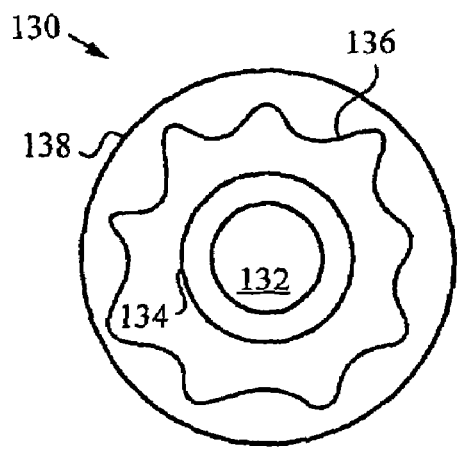

FIG. 4B illustrates yet another fiber amplifier 130 which can be used by the fiber amplifier system 10. Fiber amplifier 130 has an active, circular core 132 surrounded by a first cladding 134. Cladding 134 has a circular cross section and is in turn surrounded by a second cladding 136 with an irregular cross section. Fiber amplifier 130 has a protective outer cladding 138. The addition of cladding 134 and adjustment of its index of refraction makes it possible for fiber amplifier 130 to alter the propagation characteristics of fiber amplifier 130 to improve the in-coupling of the fiber pump light 40 into core 132 and to improve the amplification efficiency. Once again, this enables one to keep the length of fiber amplifier 130 short.

A person skilled in the art will recognize that the appropriate choice of fiber amplifier, its cross section, its length as well as pulse time $t_p$ and pulse energy are required to avoid fiber optic nonlinearities and especially those associated with stimulated Raman scattering as well as stimulated Brillouin scattering (SBS) and self phase modulation. However, to achieve good efficiency in the nonlinear element 60, high powers must be used. Although such high peak powers are good for the frequency conversion in the nonlinear element 60, they are also bad for the fiber amplifier 14. When high peak powers are put into the fiber amplifier 14, nonlinear processes (e.g., Brillouin scattering, Raman scattering, and self-phase modulation) degrade the intermediate beam 52 and prevent the fiber amplifier 14 from working as desired.

Therefore, it is critical to create a pulse train with the right pulse width and repetition rate, so that the intermediate beam 52 will be effectively frequency converted by the nonlinear element 60, but not affected adversely by the nonlinear processes that can occur in the fiber amplifier 14. The following discussion addresses the optimization of the pulse width and repetition rate.

II. Fiber Nonlinearities

A. Raman Scattering.

In a Raman scattering event, a photon is absorbed by the silica of the fiber, and simultaneously another photon is emitted. The emitted photon is shifted to the red by about 13.2 THz, or 440 cm$^{-1}$, and it leaves behind a vibrational excitation in the glass. The vibrational state then quickly dissipates into heat. Raman scattering is an effect that has gain, so even though an incident pulse at first generates only a few Raman photons, these photons increase the rate of Raman scattering, until eventually the entire pulse has been shifted to the red by the Raman effect. The length of fiber required for this conversion to take place is the Raman threshold length $L_R$.

B. Brillouin Scattering.

Another effect that shifts the frequency of the light and creates a vibrational excitation in the glass is Brillouin scattering. Although it is quite similar to Raman scattering, Brillouin scattering is considered separately for three reasons: (1) the frequency shift is very small (about 10 Ghz); (2) the light is scattered backward instead of forward; and (3) the gain profile is extremely narrow (typically about 50 Mhz).

The Brillouin threshold length $L_B$ is the length of fiber needed for the incident pulse to be converted to a backward-traveling Brillouin wave. Assuming a Fourier-transformlimited input pulse, the Brillouin threshold length increases as the pulse duration decreases, since smaller pulse times mean larger frequency spreads, and the narrow gain bandwidth of Brillouin scattering requires a narrow input frequency bandwidth for efficient scattering.

Since the incident pulse and the Brillouin scattered light travel in opposite directions, the Brillouin light walks off from the incident pulse quite rapidly. Even so, the length of fiber required for the Brillouin wave to walk off, $L_{BW}$, can easily be longer than the Brillouin threshold length $L_B$ so that Brillouin scattering will still reach threshold. The Brillouin scattering limit to the power achievable in the fiber amplifier 14 can be determined by finding the power for which the Brillouin threshold length $L_B$ is equal to the Brillouin walkoff length $L_{BW}$.

C. Self Phase Modulation.

The fiber amplifier 14 is typically made from a material such as silica. The nonlinear index of refraction of silica and other common fiber materials depends upon the intensity of light present. Therefore, a primary pulse 36 passing through the fiber amplifier 14 gains an extra phase that varies along the length of the pulse according to the pulse's instantaneous intensity. The rate of change of this phase is a frequency chirp that broadens the frequency bandwidth of the pulse. The nonlinear length $L_N$ is the length of fiber necessary for the peak of the pulse to gain an extra phase of $2\pi$. This phase gives the pulse a frequency chirp $\delta v$. Typically, $\delta v$ should be less than about 600 Ghz, to ensure efficient frequency doubling by LBO.

Through an analysis of the combined effects of Raman scattering, Brillouin scattering, and Self-Phase modulation, the inventors have determined an optimum pulse format that is compatible with both frequency conversion and pulse amplification. The following section discusses this pulse format.

III. Pulse Format

A. Maximum Pulse Length

Since Brillouin scattering occurs in the backward direction, the Brillouin wave quickly walks off from the initial pulse, and therefore loses the source of its gain. So intuitively, shorter pulses will be better, since the walkoff will occur faster, before much power can be built up. Furthermore, as discussed above, shorter pulses have a higher frequency spread, and this frequency spread also increases the Brillouin threshold.

The situation is discussed by Govind Agrawal in his book Nonlinear Fiber Optics (Third Edition, Academic Press, 2001). Agrawal notes that Brillouin scattering occurs by building up an acoustic wave. He introduces the phonon lifetime $T_B$, which is approximately equal to 10 nsec. Agrawal states that for "pulses of width $T_0<T_B$, the Brillouin gain is substantially reduced (p. 359)." Thus, based on Agrawal's analysis of Brillouin scattering alone, one would expect that the threshold intensity for Brillouin scattering to increase as the pulse length decreases. But, in the system 10, the reason for decreasing the pulse length of the primary pulses 36 is to increase the corresponding peak intensity of these pulses. Thus it would appear that at least some Brillouin scattering would be present no matter how short the pulse.

Figure 9:
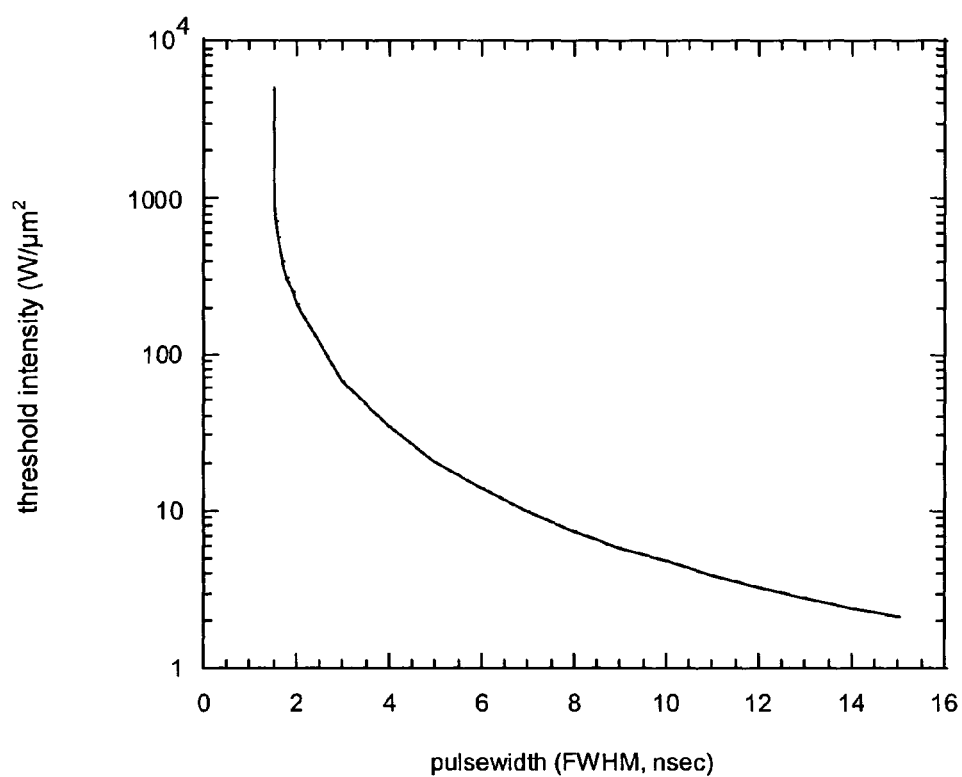
FIG. 9 depicts a graph of Brillouin threshold versus pulse length.

However, Agrawal does not address the combined effect of Brillouin scattering and self-phase modulation. As discussed above, self-phase modulation broadens the spectrum of the amplified pulse. This broadening further reduces the Brillouin scattering, and the effect is greater for shorter pulses. In fact, the inventors have discovered that there is a critical pulse length, shorter than which Brillouin scattering will never reach threshold, because of the self-phase modulation. As the pulse travels down the fiber, its frequency spectrum broadens quickly enough that the Brillouin scattering can never build up significant intensity. The inventors have calculated the effect of self-phase modulation on the threshold for Brillouin scattering. The results of these calculations are shown in the graph of Brillouin threshold versus pulse length of FIG. 9. From the graph it can be seen that below a pulse length of about 1.7 nsec, the Brillouin threshold is, for practical purposes, infinite. Thus, if the pulses from the source 10 have a pulse length of less than about 1.7 nsec, the Brillouin scattering is not a problem.

B. Minimum Pulse Length

The shorter the primary pulses 36, the more their spectrum broadens due to self phase modulation in the fiber amplifier 14. If the spectrum of the primary pulses 36 is too broad, however, the pulses 54 of the intermediate beam 52 often cannot be converted to the desired wavelength by the nonlinear element 14, e.g., where the nonlinear element is a frequency doubling crystal. Since the frequency bandwidth of a pulse is inversely related to the pulse length, the pulse length of the primary pulses 36 should be long enough that frequency bandwidth of the corresponding intermediate pulses 54 after they emerge from the fiber amplifier 14 is less than the acceptance bandwidth of the nonlinear frequency converting element 60. The lower limit on $T_{pulse}$ depends on the nonlinear material used in the nonlinear frequency converting element. For example, to maintain a usefully narrow frequency spectrum for frequency doubling in lithium borate (LBO), the pulse width should be greater than about 100 psec.

C. Minimum repetition rate

There are two reasons for wanting a high repetition rate. First, for low repetition rates, amplified spontaneous emission becomes a problem during the quiet times between pulses. During these quiet times, the fiber is being charged up by the pump, with no place for the energy to go. Eventually, spontaneous emission will touch off a chain reaction that will extract the power from the fiber, leaving nothing behind with which to amplify the PQSL pulse. To prevent spontaneous emission in the fiber amplifier between pulses from initiating such a chain, the repetition rate needs to be sufficiently large that amplified spontaneous emission in the fiber amplifier between pulses does not extract more than 50% of the total power from the fiber amplifier, e.g., greater than about 100 kHz (typically). With respect to a PQSL such as the fiber amplifier system 10 the repetition rate can be adjusted by adjusting the power of the pump light 20. Generally speaking, the greater the power of the pump light 20, the greater the repetition rate of the PQSL.

Another reason that high repetition rates are desirable is that light sources used in display systems often require a rapid refresh rate. For example, in a grating light valve (GLV)-type display, an entire column of pixels is illuminated at the same time. If there are about 2000 columns in the image, and the image changes at 50 frames per second, this requires a minimum of 100 kHz repetition rate for the laser. However, to eliminate speckle, and alleviate the need for exactly timing the pulses with the GLV scanner, it is preferable to have a repetition rate of about 10 times the theoretical minimum, or about 1 MHz.

It has been difficult to obtain laser pulses between 50 ps and 2 ns at such high repetition rates. Q-switched lasers typically provide pulses greater than about 5 ns long. Mode-locked lasers generally provide pulses less than 50 ps long. In addition, mode-locked lasers tend to be much larger than Q-switched lasers. For example, the largest dimension on a typical mode-locked laser is typically on the order of one to two feet. The largest dimension on a PQSL, by contrast, is on the order of one to two inches.

In order to make a PQSL with the desired pulse length, the length L of the resonator cavity 26 is a critical parameter. There are two reasons to make the resonator cavity 26 very short. First, the pulses get shorter as the resonant cavity gets shorter. Second, the PQSL will oscillate at a single frequency only if the resonator is so short that it supports only one mode of oscillation. The length of the resonator cavity such as that shown in FIG. 3A is almost totally determined by the thickness of the gain medium 84. However, if the gain medium becomes too thin, it won't absorb enough of the PQSL pump light 20 to provide a useful intensity in the pulsed primary beam 34. Usually it is desired to absorb as much radiation as possible. However, the inventors have determined that the PQSL 12 can operate effectively with the desired pulse length even if the gain medium is so thin that it absorbs less than half of the PQSL pump radiation. For 1064 nm, design of the PQSL to obtain the desired pulse length is relatively straightforward. Spuhler, e.g., indicates that the pulse period (pulse length) $T_{pulse}$ for a PQSL can be determined from $$T_{pulse} = \frac{3.52 t_{rt}}{q_0}$$

where $t_{rt}$ is the round trip pulse time defined above and $q_0$ is the saturable loss in the passive Q-switch in the PQSL. For radiation corresponding to certain transitions, e.g., the 914-nm transition in Nd, additional design considerations must be taken into account. A PQSL for producing 914-nm is described in U.S. patent application Ser. No. 10/662,086, which has been incorporated herein by reference.

IV. Fiber Design

In addition to the pulse format, optimized frequency conversion requires optimization of the fiber amplifier 14. The following discussion addresses issues of fiber design.

A. Figure of Merit

The inventors have found that, due to the limitations imposed by Raman scattering, a fiber's capacity to generate light depends on the product of its absorption β of pump light 40 (measured in dB/m), and the mode area of the light to be amplified, $A_{mode}$ measured in square microns (μm²). The inventors have derived for a fiber a "figure of merit", or "FOM" denoted by the symbol z, which has a critical value that can be used to optimize the fiber amplifier 14.

The figure of merit (FOM) z can be derived as follows. The fiber amplifier 14 will produce an average output signal power S of beam 52 from an average power P of pump light 40. Powers S and P are related by an equation of the type:

$$S = \varepsilon P(1 - e^{-\beta' L_f}) - \Theta L_f \qquad (1)$$

where ε is the conversion efficiency of the fiber amplifier 14, $L_f$ is the fiber length in meters and β' is the fiber absorption coefficient for pump light in the pump guide in units of (meters)⁻¹. The fiber absorption β' is defined as:

$$\beta' = \frac{\ln\left(\frac{Q_i}{Q_t}\right)}{L_f};$$

where $Q_i$ is the amount of pump light coupled into the pump guide of the fiber amplifier 14 and $Q_t$ is the amount of pump light transmitted through the fiber amplifier 14. Thus, β' is a constant of the fiber used in the fiber amplifier 14 independent of the fiber length. As a practical matter the fiber absorption can be determined as core absorption multiplied by the ratio of the cross-sectional area of the core of the fiber to the cross-sectional area of the core plus the pump guide. The term $\Theta L_f$ takes into account the possibility that the fiber amplifier 14 may absorb radiation at the wavelength being amplified, as is the case for 914-nm (but not 1064-nm) radiation in Nd-doped fibers. The quantity Θ has units of Watts/meter and represents a threshold signal power needed before absorption is overcome and the fiber amplifier 14 can amplify. The derivation of z proceeds by eliminating $L_f$ in favor of z. For fiber amplifiers that do not significantly absorb the radiation being amplified Θ=0, which is assumed for the rest of the derivation for the sake of example. In practice, the resulting figure of merit z does not change significantly even where absorption of 914-nm cannot be neglected so Θ=0 can be assumed for both 914-nm and 1064-nm radiation.

The Raman scattering threshold is determined by:

$$\frac{p L_f g_r}{A_{mode}} = 16 \qquad (2)$$

where p is the peak power of the input signal, $g_r$ is the Raman gain and $A_{mode}$ is the cross-sectional area of the amplified mode. $A_{mode}$ is defined as the area within which the intensity of the amplified mode is not less than 1/e² times the intensity of the mode at its maximum. For a circular Gaussian mode this is equal to πd²/4, where d is the full width at 1/e² times maximum. For an elliptical Gaussian mode $A_{mode}$ is given by $\pi d_{major} d_{minor}/4$, where $d_{major}$ and $d_{minor}$ are the full width at 1/e² times maximum along the major and minor axes of the ellipse.

Solving equation (2) for $L_f$, one obtains:

$$L_f = \frac{16 A_{mode}}{g_r p}. \qquad (3)$$

When equation (3) is substituted back into equation (1) and assuming Θ=0, one obtains:

$$S = \varepsilon P\left(1 - e^{-\beta' \frac{16 A_{mode}}{g_r p}}\right). \qquad (4)$$

The form factor z can be defined as:

$$z = \beta' \frac{16}{g_r} A_{mode} \qquad (5)$$

The value of the Raman gain $g_r$ is approximately $10^{-10}$ kW/m (see Agrawal, *Nonlinear Fiber Optics*, cited above). Converting $\beta'$ in $m^{-1}$ to $\beta$ in dB/m and expressing the mode area in $\mu m^2$ one obtains:

$$z = (0.037)\beta(dB/m) A_{mode}(\mu m^2) \quad (6);$$

where $$\beta = \beta' \cdot \frac{10}{\ln(10)} \approx 4.34 \beta'.$$

The nonlinear element 60 converts the amplified signal to the output beam 62 at an efficiency $\delta(p)$ that depends on the peak power p. The average power B(z, p) of the output beam 62 depends on the peak power p and the form factor z and is given by:

$$B(z, p) = \delta(p)\varepsilon P\left(1 - e^{-\frac{fz}{p}}\right) \quad (7)$$

In equation (7), f denotes a correction factor that depends on the pulse shape for the primary pulses 36 and the pumping configuration of the fiber amplifier 14. For example, if the fiber amplifier 14 has a double-pass pump configuration f gets a factor of 2. Because p is not constant along the length of the fiber amplifier 14 but increases with distance along the fiber f gets another factor of 2. One would therefore expect a value of f greater than or equal to 4.

For a fixed value of the figure of merit z one can determine the best value $p_0$ of the peak power p by solving $$\left. \frac{\partial B(z, p)}{\partial p} \right|_{p_0} = 0 \quad (8)$$

By plugging the best value $p_0$ into equation (7) one can obtain a best value of B as a function of z. A method for optimizing the fiber amplifier using the figure of merit z can be summarized as follows.

First the conversion efficiency $\delta(p)$ of the nonlinear frequency converting element 60 is determined as a function of a peak power of an input signal coupled into the fiber amplifier. This can be done by experimental measurement or, in some cases can be provided by the supplier of the nonlinear element 60. Next, using equation (7), the average power of output radiation B(z, p) from the nonlinear frequency converting element 60 can be calculated as a function of the peak power p and a figure of merit z. A best value $p_0$ of the peak power p is then determined by solving $$\left. \frac{\partial B(z, p)}{\partial p} \right|_{p_0} = 0.$$

Next, a best value of the average power of the output radiation $B_{best}(z)$ is determined as a function of the figure of merit z by substituting $p_0$ into equation (7).

A desired value $B_d$ of the average power of output radiation from the nonlinear frequency converting element 60 is determined from requirements of an application for which the fiber amplifier system 10 is to be used.

From the desired value $B_d$ and the calculated $B_{best}(z)$ one can determine a minimum value $z_{min}$ of the figure of merit for the fiber, e.g., using graphical, numerical, or analytical methods. From $z_{min}$ one can select a fiber amplifier characterized by values of $\beta$ and $A_{mode}$ such that for the fiber amplifier z is greater than or equal to $z_{min}$.

From an analysis of the best value of B the inventors have determined that, if the nonlinear element 60 is lithium borate (LBO), to obtain sufficient intensity for frequency conversion in the nonlinear element 60, the fiber amplifier 14 should have z greater than about 0.1, preferably greater than about 0.5. If the nonlinear element 60 has a higher nonlinearity than LBO, the fiber amplifier 14 can have a lower value of z.

As a numerical example, for LBO, the conversion efficiency $\delta(p)$ is given approximately by $$\delta(p) = \frac{A}{1 + \left(\frac{B}{p}\right)^n}; \quad (9)$$

where A=0.43; B=2.0 kW; and n=1.2.

Figure 10:
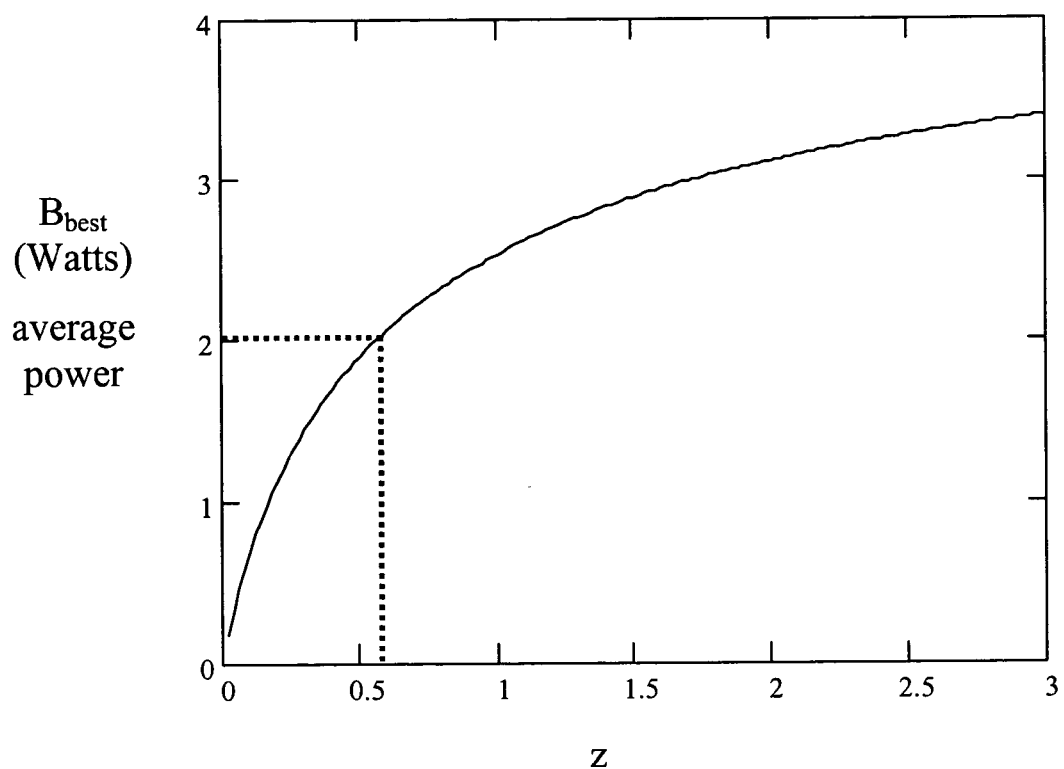
FIG. 10 depicts a graph of a best value of the average power of the output radiation from a fiber amplifier as a function of a figure of merit for the fiber amplifier according to an embodiment of the present invention.

Equation (9) can be substituted into equation (7). For the sake of example the following values are assumed: P=20 W; $\epsilon$=0.50 and f=7.4 (determined experimentally). From equations (7) and (8) one can obtain an equation for $B_{best}(z)$. FIG. 10 depicts a graph of $B_{best}(z)$ for the present example. If the desired average output power $B_d$ must be above some threshold, the corresponding value of the FOM z for the fiber amplifier 14 can be found from the graph. For example, for $B_d$ greater than 2 W, z must be greater than about 0.6.

B. Core Index Range

It would appear at first glance that a sufficiently high Nd concentration would maximize the absorption $\beta$ in Eq. (1). However, in solution doping processes commercially used to dope the core of fiber amplifiers, higher Nd concentration requires higher $\Delta n_{core}$, which means a smaller mode area. Therefore, the absorption $\beta$, which is proportional to the product of the core area and the Nd concentration, is not increased by higher Nd concentration. In this case, it is better to have a low Nd concentration; the core then can have a small refractive index, allowing the mode area, and hence the FOM, to be large. To maximize the FOM, the inventors have empirically determined that $\Delta n_{core}$ typically has to be between about 0.0025 and about 0.006. If the core index is too low, the core does not guide the light well.

C. Elliptical Core.

It is possible to make a fiber amplifier such as that shown in FIG. 4A or FIG. 4B, having a core with an elliptical cross-section. The inventors have determined that using a fiber amplifier with an elliptical core increases the FOM by a factor of 2 or so. An elliptical core is also preferable because it maintains the polarization of the amplified light, so that beam 52 is polarized. This polarization is important because nonlinear element 60 requires a polarized input to operate efficiently.

D. W-fiber.

Figure 11A:
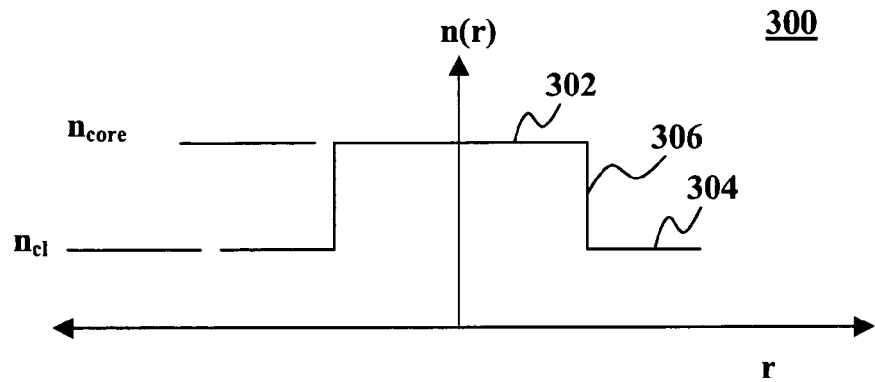
FIG. 11A depicts a refractive index profile for a conventional fiber.
Figure 11B:
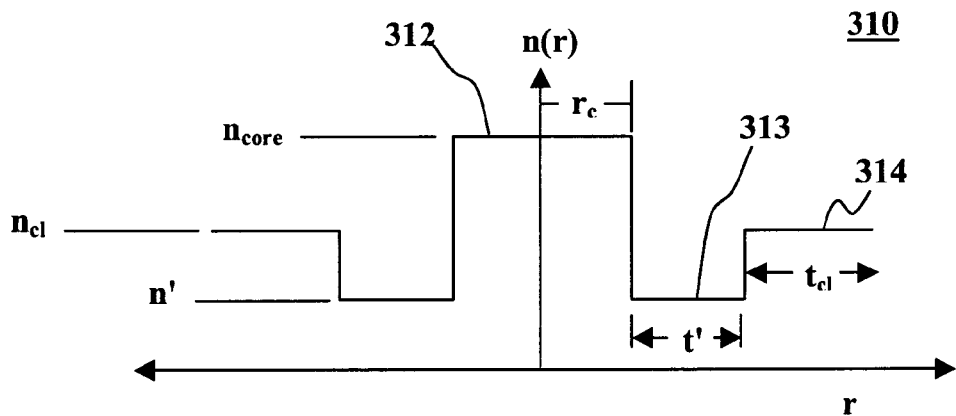
FIGS. 11B–11C depict refractive index profiles for rejecting undesired wavelengths from the core of a fiber according to an embodiment of the present invention.

A W-fiber has an index profile with depressed index cladding surrounding the core. When the primary wavelength $\lambda_p$ is approximately 0.91 $\mu$m and the core 50 of fiber amplifier 14 is doped with Neodymium (Nd), it is preferable to use a W-fiber for the fiber amplifier 14 to suppress unwanted gain at approximately 1.05 $\mu$m. The principle behind the W-fiber is based on the observation that a typical fiber core surrounded by a cladding always has at least one bound mode at any wavelength. FIG. 11A depicts a graph 300 of refractive index n versus radial distance r from the center of a typical optical fiber. The core region 302 typically has a higher refractive index than the cladding region 304. Total internal reflection takes place at the interface 306 between the core region 302 and the cladding region 304. However, if a narrow region of lower refractive index than the cladding region 304 surrounds the core region 302 light may tunnel out of the core region 302. It is possible in such a situation that light at certain wavelengths will have no bound modes. The situation is depicted schematically in the graph 310 of FIG. 11B. In FIG. 11B, a fiber has a core region 312 surrounded by a tunnel cladding region 313. A cladding region 314 surrounds the tunnel cladding 313 and core region 312. The core is characterized by a refractive index $n_{core}$ and a radius $r_c$. The cladding region 314 is characterized by a refractive index $n_{cl}$ and a thickness $t_{cl}$. The tunnel cladding region 313 is characterized by a refractive index n' and a thickness t'. Generally, $n' < n_{cl} < n_{core}$. Such a refractive index profile is sometimes referred to as a "W" profile. The propagation of radiation in fibers having such profiles is described in detail by Michael Monerie in "Propagation in Doubly Clad Single-Mode Fibers", IEEE Journal of Quantum Electronics QE-18 (1982) p. 525, which is incorporated herein by reference, and references therein. If the values of $n_{core}$, $n_{cl}$, n', $r_c$, $t_{cl}$ and t' are chosen such that an average squared index of refraction $\{n^2(r)\} < n_{cl}^2$, then there exists a cutoff wavelength $\lambda_c$ for which light having wavelengths (in vacuum) greater than $\lambda_c$ will have no bound modes. Undesired wavelengths above $\lambda_c$ will be scattered out of the fiber along its length while bound modes of desirable wavelengths below $\lambda_c$ are retained in the fiber. The wavelength $\lambda_c$ is the cutoff wavelength of the fundamental ($LP_{01}$) mode. Generally the tunnel cladding region 313 is thick enough that $\{n^2(r)\} < n_{cl}^2$ but thin enough to provide efficient tunneling of the undesired wavelengths. Thus, by properly engineering the refractive index profile of a fiber, it is possible to have a "W" profile wherein 0.91 μm<$\lambda_c$<0.05 μm. For such a fiber, light of wavelength 1.05 μm will not have a bound mode and will pass out of the fiber along its length. Light of wavelength 0.91 μm will have a bound mode that will be contained by the fiber. The overall effect is to reject the undesired 1.05 μm radiation while retaining the desired 0.91 μm radiation.

Figure 11C:
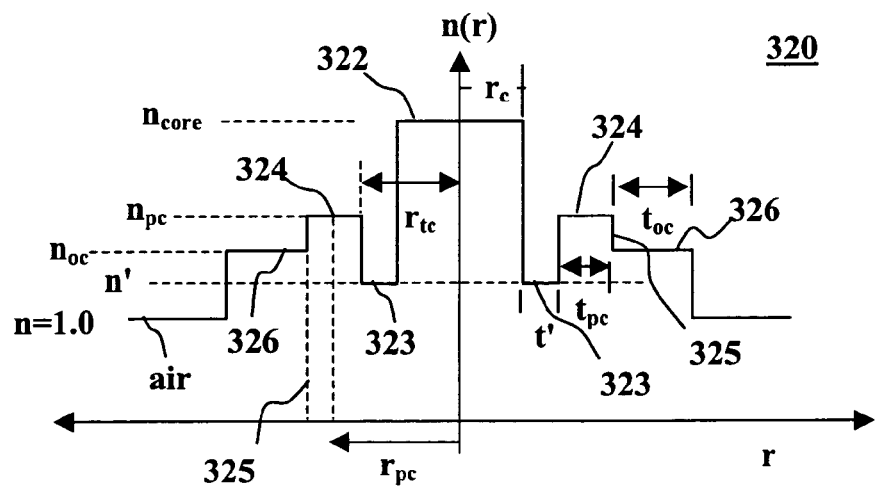

A specific embodiment of a practical application of this principle utilizes a triply clad fiber illustrated by the refractive index profile 320 of FIG. 11C. The fiber generally comprises, as shown in FIG. 11C, a core region 322 surrounded by a tunnel cladding region 323. A pump cladding region 324 surrounds the core 322 and tunnel cladding 323 regions. An outer cladding region 326 surrounds the core 322, tunnel cladding 323, and pump cladding 324 regions. The core is characterized by a refractive index $n_{core}$ and a radius $r_c$. The tunnel cladding region 323 is characterized by a refractive index n', a thickness t' and corresponding radius $r_{tc} = r_c + t'$. The pump cladding region 324 is characterized by a refractive index $n_{pc}$ and a thickness $t_{pc}$. The outer cladding is characterized by an index of refraction $n_{oc}$ and a thickness $t_{oc}$. The outer cladding may be surrounded by air having an index of refraction of about 1.0. Generally, $n' < n_{pc} < n_{core}$ and $n_{oc} < n_{pc}$. Such a configuration allows the undesired radiation to tunnel out of the core region 322. Total internal reflection at an interface 325 between the pump cladding 324 and outer cladding 326 provides a bound mode that confines the pumping radiation for efficient pumping of the core region 322. Here, $\{n^2(r)\}$ is defined as:

$$\langle n^2(r) \rangle = \frac{1}{A} \int_0^{r_{pc}} r\, dr\, d\theta\, n^2(r)$$

where $r_{pc}$ represents some distance from the axis of the fiber that lies within the pump cladding and A represents a cross sectional area of the fiber within $r_{pc}$ of the axis. For example, if the fiber has a circular cross section, $A = \pi r_{pc}^2$. The radius $r_{pc}$ is typically greater than a few undesired wavelengths.

It is also advantageous to use a W-fiber even when a fundamental cutoff wavelength is not needed. This is because a W-shaped index profile, such as that shown in FIG. 11B allows a larger single-mode core than the single-step index profile depicted in FIG. 11A. In particular, a single mode core is characterized by a cutoff V-number $V_{cl}$, defined as $$V_{cl} = \frac{2\pi r_c}{\lambda_{cl}} \sqrt{n_{core}^2 - n_{cl}^2}$$

where $\lambda_{cl}$ is the second mode or $LP_{11}$ cutoff wavelength. For the single-mode core of FIG. 11A, $V_{cl} = 2.405$. However, for the W-fiber of FIG. 11B, the parameters $r_c$, t', $n_{core}$, and n' can be adjusted so that $V_{cl}$ is 3.0 or greater. As such, the mode area and, consequently, the FOM can be greater for a W-fiber than for a single-step fiber.

Through appropriate use of a W-fiber, the fundamental cutoff wavelength $\lambda_c$ of the fiber amplifier 14 can be engineered to be above the primary wavelength $\lambda_p$ so that the fiber amplifier system 10 can be used with to preferentially generate blue or green light. A general discussion of the selection rules for design of a fiber amplifier with a particular cut-off wavelength $\lambda_c$ is described in detail in commonly assigned U.S. Pat. No. 6,563,995, which is incorporated herein by reference. Two examples, among others, of the use of such a W-fiber for generation of blue light are as follows.

EXAMPLE 1

Neodymium Doped Fiber Amplifier

The amplifier includes the W-fiber having a core having index $n_{core}$, a depressed cladding having index $n_{tc}$, and a secondary cladding having index $n_{pc}$, as described above. In addition, the core is doped with Neodymium ions (on the order of $10^{20}$ ions per cm$^3$, for example), and the secondary cladding is surrounded by an outer cladding having a refractive index $n_{oc}$, where $n_{oc} < n_{pc}$. The secondary cladding is used for guiding pump light that excites the Nd atoms. The secondary cladding typically has a mean diameter between 40 μm and 80 μm.

The secondary cladding is optically coupled to laser diodes having a wavelength in the vicinity of 808 nm. The light from these diodes creates gain in the core, both near 900 nm and near 1050 nm. Light near 900 nm is input into the core and is to be amplified. Light at 1050 nm is generated by the four level transition of Nd atoms and is undesired. As an example, the light to be amplified has a wavelength of 914 nm, corresponding to light from a laser comprising a Neodymium-doped Yttrium vanadate crystal.

Thus, in this example, the indices of refraction $n_{core}$, $n_{tc}$, and $n_{pc}$ and the radii $r_c$ and $r_{tc}$ are selected to give a cutoff wavelength $\lambda_c$ between 914 nm and 1050 nm. As an example, $r_c = 3$ μm and $r_{tc} = 6$ μm. The secondary cladding is fused silica having $n_{pc}$=1.458. The outer cladding is a polymer cladding. The core is characterized by $n_c$-$n_{pc}$=0.0022, and the depressed cladding has index $n_{tc}$ given by $n_{pc}$-$n_{tc}$=0.0022. Accordingly, the fiber in this example has a cutoff wavelength $\lambda_c$ of about 975 nm. The loss at 1050 nm is approximately 1400 dB/m.

EXAMPLE 2

Ytterbium Doped Fiber Amplifier

This example is similar to the Neodymium doped fiber amplifier described in Example 1. The secondary cladding again becomes a pump cladding. The core is doped with Ytterbium atoms. When pumped with 920 nm light, the Ytterbium exhibits gain both at 980 nm and at approximately 1050 nm. The W-fiber parameters are adjusted to give a cutoff wavelength $\lambda_c$ between 980 nm and 1050 nm, with a suitable loss at 1050 nm.

E. Air Clad Fiber

Figure 12:
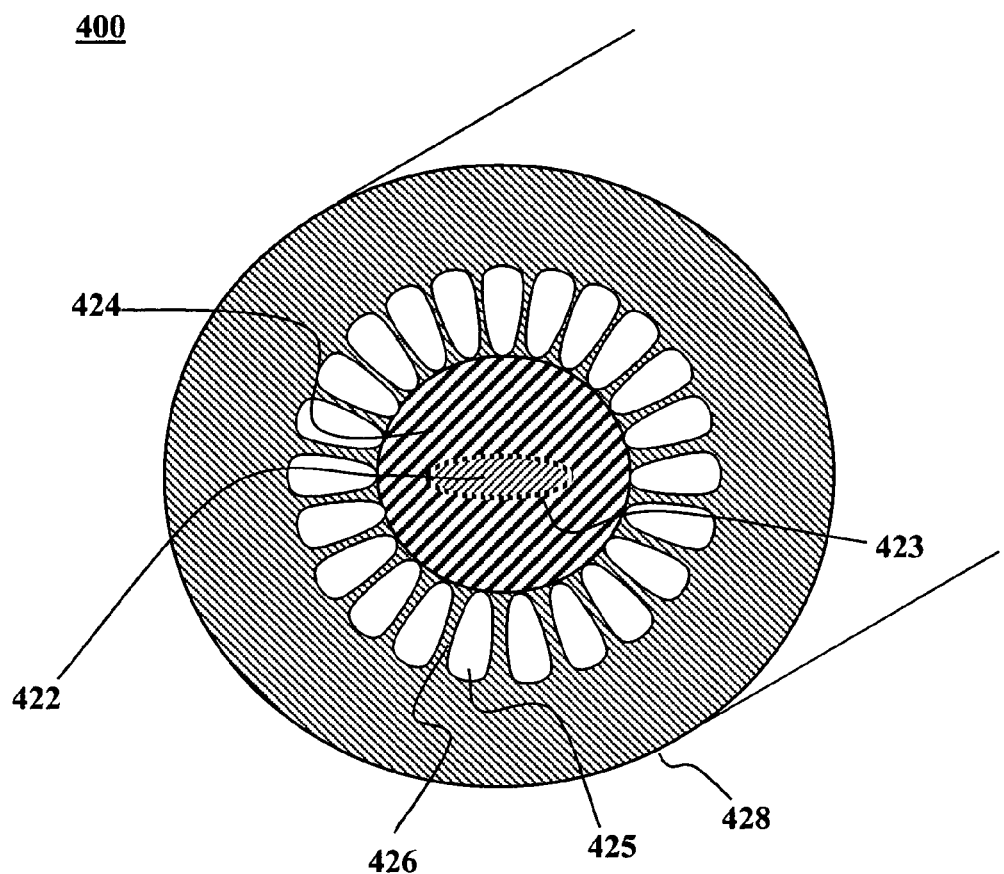
FIG. 12 depicts a cross-sectional schematic diagram of an air-clad fiber of a type that may be used with embodiments of the present invention.

The absorption β (and hence the FOM) can be improved by making the pump guide smaller. However, the numerical aperture (NA) of the pump guide must simultaneously be made larger, so that light can be coupled in. In a preferred embodiment, the fiber amplifier 14 uses a cladding-pumped fiber with a core surrounded by an air cladding. Cladding pumped, air clad fibers are described, e.g., by R. Selvas et al in "High-Power, Low-Noise, Yb-doped, cladding pumped three-level fiber sources at 980 nm," Optics Letters, Vol. 28, No. 13, Jul. 1, 2003, which is incorporated herein by reference. FIG. 12 depicts an example of air-clad fiber 400 having an elliptical core 422. A depressed cladding 423 surrounds the core 422. A pump cladding 424 surrounds the depressed cladding 423. A set of glass bridges 426 connects the pump cladding to an outer cladding 428. Voids 425 between the glass bridges 426 provide an air cladding that surrounds the pump cladding.

V. Alternative Fiber Amplifier System

Figure 5:
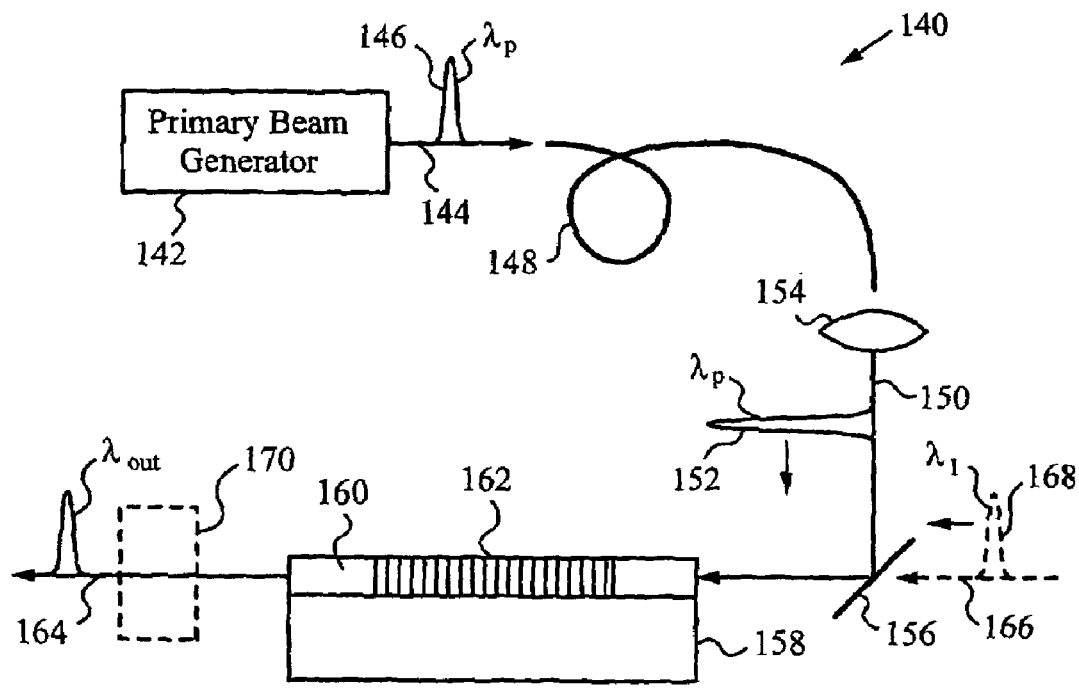
FIG. 5 is a diagram of another embodiment of a light source according to the invention.

FIG. 5 is a diagram of an alternative fiber amplifier system 140 according to another embodiment of the invention. In the fiber amplifier system 140 a primary beam generator 142 combines a pump source and a passively Q-switched laser and delivers a primary beam 144 having pulses 146 (only one indicated) of light at primary wavelength $\lambda_p$. The pulses 146 are formatted in accordance with the guidelines given above.

The primary beam 144 is delivered to a fiber amplifier 148. The fiber amplifier 148 amplifies the primary beam 144 to produce an intermediate beam 150 still at primary wavelength $\lambda_p$. The intermediate beam 150 consists of pulses 152 (only one shown) which have a pulse duration, an inter-pulse separation and peak power defining a format calibrated to obtain at least 10% frequency conversion efficiency and preferably up to 50% or higher frequency conversion efficiency in a nonlinear element 158.

A lens 154 and a beam guiding element 156 are placed in the path of intermediate beam 150 for directing it to nonlinear element 158. Nonlinear element 158 has a waveguide 160 with a quasi-phase-matching (QPM) grating 162 disposed therein. QPM grating 162 is designed for phasematching the frequency conversion operation by which intermediate beam 150 is converted to an output beam 164 at output wavelength $\lambda_{out}$. The frequency conversion operation producing output beam 164 is second harmonic generation (SHG). Conveniently, nonlinear element 158 with QPM grating 162 is a PPLN, PPLT, PPKTP, MgO:LN or other poled structure.

Alternatively, the frequency conversion operation can be optical parametric generation (OPG) or another type of nonlinear frequency conversion operation such as difference frequency generation (DFG). OPG is an alternative to SHG because it is a highly-efficient, single-pass and single input wavelength process (the requisite idler and signal beams are usually obtained by vacuum amplification). In addition, the output spectrum of output beam 164 is somewhat broadened (typically by a few nm) when OPG is used, making it more suitable for certain applications, e.g., for image displays. On the other hand, when DFG is used as the frequency conversion operation a beam 166 at wavelength $\lambda_1$, is required to mix with intermediate beam 150 in nonlinear element 158. In such situations pulses 168 (only one shown) of beam 166 should be synchronized with intermediate pulses 152. Also, beam guiding element 156 is then adapted to function as a beam combiner. Furthermore, a filter 170 can be provided for removing unwanted frequencies exiting nonlinear element 158.

Several frequency conversion processes, i.e., a cascaded nonlinear conversion process can be implemented in nonlinear element 158 and use beam 150 in conjunction with beam 166 (and/or other beams besides beam 166) or without it. Such operations may involve several nonlinear operations in series. For example, second harmonic generation followed by sum frequency generation, resulting in third harmonic generation.

VI Image Projection System

Figure 6:
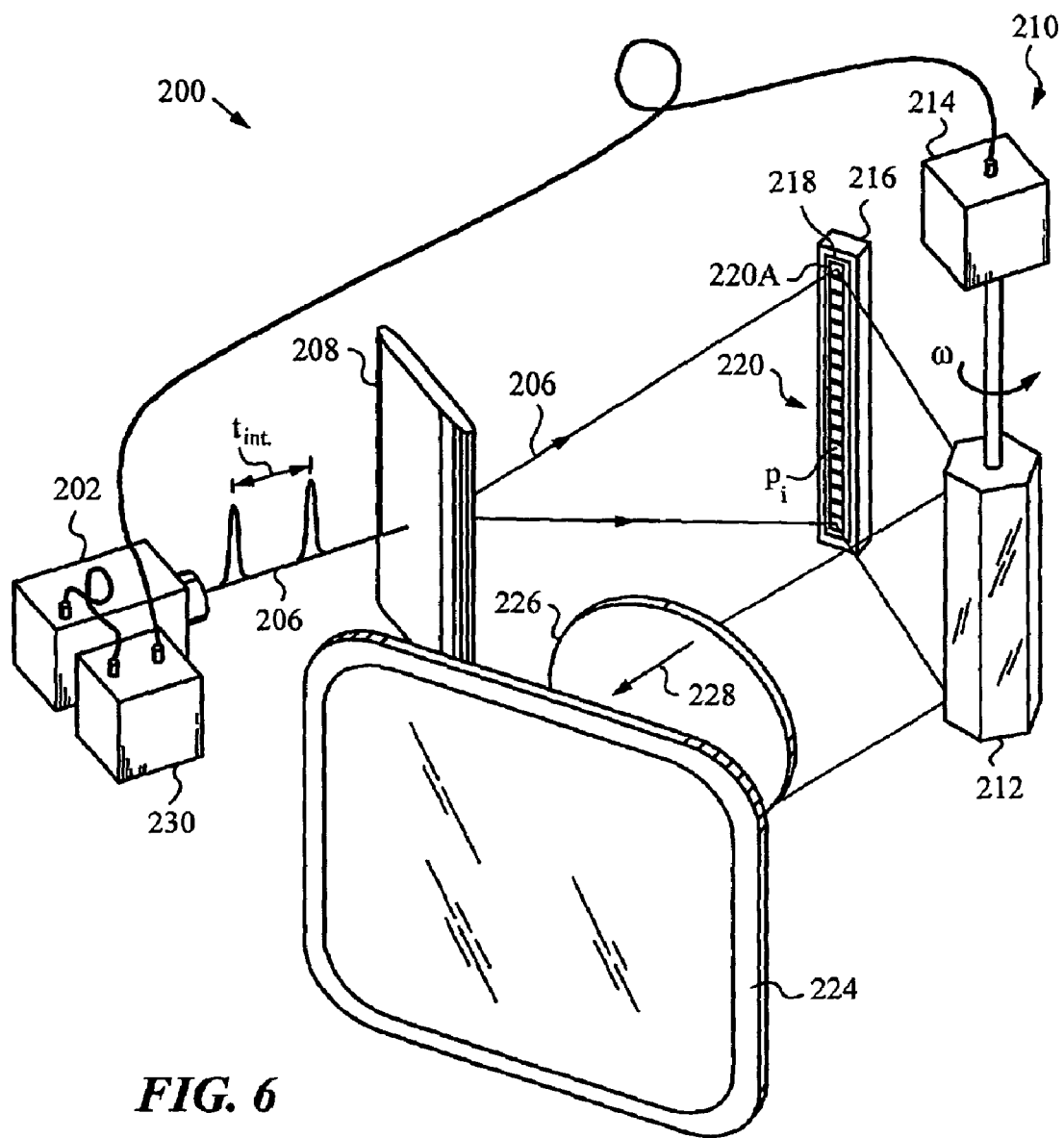
FIG. 6 is an isometric view of a display system in accordance with the invention.

In a particularly convenient embodiment of the invention shown in FIG. 6 an image display system 200 employs a projection light source 202. In this case image display system 200 is a scanned linear image display system. Projection light source 202 has a first and a second light source (not shown in this figure) as described above for producing output in the green wavelength range and in the blue wavelength range, respectively. These two light sources are used one after the other or sequentially for a certain amount of time, as described below. Each of these two light sources is set to deliver an output beam 206 at an average power of 2.5 Watts. For this purpose the duty cycle of the intermediate beam is set at 0.05% and the peak power of intermediate pulses is set at 10,000 Watts. With this pulse format the conversion efficiency is about 50%. Hence, output beam 206 will have an average power of 2.5 Watts (5,000 Watts of peak power at 0.05% duty cycle).

It is convenient to also provide projection light source 202 with a third light source producing output in the red wavelength range. In this embodiment, the third light source is a diode laser producing 2.5 Watts average power at a red wavelength. The output of the third light source is coordinated with the output of the first and second sources, such that only one color is present in output beam 206 at a time.

Figure 7:
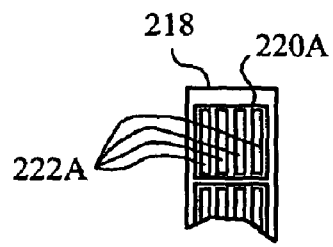
FIG. 7 is a plan view of a pixel in the display system of FIG. 6.

Image projection system 200 has cylindrical beam shaping and guiding optics 208, generally indicated by a cylindrical lens. Of course, guiding optics 208 will typically include a number of lenses and other elements, as will be appreciated by a person skilled in the art. Optics 208 are adapted for line-wise image scanning by expanding output beam 206 along the vertical direction. An image generator 216 having a vertical line 218 of pixel generators $p_i$ is positioned in the path of expanded output beam 206. Image generator 216 can be any suitable unit capable of generating images line-by-line and requiring illumination by red, green and blue wavelengths in succession, as provided in output beam 206. By way of example, image generator 216 may be a grating light valve array made up of vertical line 218 of independently controlled grating-type light valves 220. Each one of light valves 220 corresponds to a pixel generator $p_i$. FIG. 7 illustrates a light valve 220A having adjustable grating grating strips 222A. Strips 222A are moved by a suitable mechanism to adjust the grating of light valve 220A to diffract a particular color into a projection beam 228. The principles of operation and design of grating-type light valves are known and the reader is referred for further information to David T. Amm et al., "Optical Performance of the Grating Light Valve Technology", presented at Photonics West—Electronic Imaging 1999, Projection Displays.

A linear scanner 210 having a rotating deflection unit 212 and a control 214 is provided for line-wise scanning of projection beam 228. The scanning speed is controlled by control unit 214 which adjusts the angular speed of rotation ω of deflecting unit 212. A person skilled in the art will recognize that other types of optics and scanning devices can be used, depending on the method of image scanning.

The scanned image produced by image generator 216 is projected on a display screen 224 with the aid of optics 226, generally indicated by a lens. In particular, light valves 220, are set to diffract red, green and blue wavelengths provided in beam 206 to generate an image linewise in the diffracted projection beam 228. Beam 228 is projected by optics 226 on screen 224 to display the image to a viewer. In one implementation certain light valves 220 are dedicated to each color. The image projected on the screen 224 is made up of a series of lines of pixels generated by the pixel generators $p_i$, e.g., 2000 lines. The pixel generators $p_i$ sequentially generate lines of pixels as the as the projection beam 228 scans horizontally across the screen 224.

Preferably, in this case valves 220 are subdivided into groups of three one for diffracting blue, another for diffracting green and a third one for diffracting red into projection beam 228. Alternatively, light valves 220 can be modulated to diffract different colors at different times (e.g., by time-multiplexing).

A synchronizing mechanism 230 is connected to projection light source 202 and to control 214 of linear scanner 210. Mechanism 230 is provided to coordinate the timing of output pulses 232 in output beam 206 with the line scanning performed by linear scanner 210.

Figure 8:
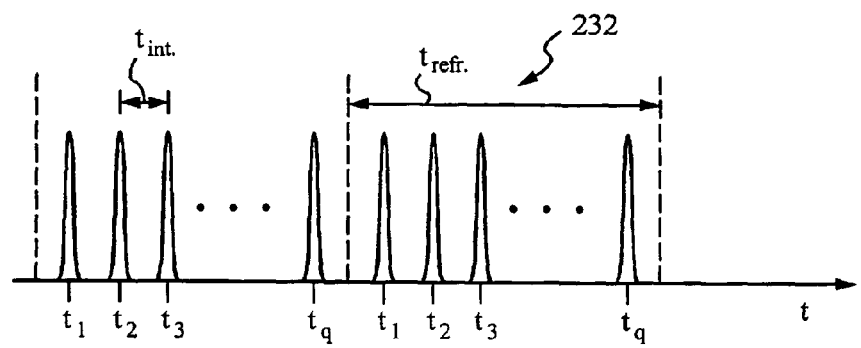
FIG. 8 is a timing diagram illustrating the synchronization of the refresh rate with the pulse rate.

When operating image display system 200 projection light source 202 is set to deliver output pulses 232 at the green wavelength from light source one, at the blue wavelength from light source two, and at the red wavelength from light source three. The pulses are repeated at a certain rate (i.e., at the inter-pulse rate set as described above). Specifically, as better illustrated in FIG. 8, light source 202 is set to deliver a number q of pulses 232 during a refresh time $t_{refr}$ which is the time allotted by control 214 of linear scanner 210 to generating each line of the image. Preferably, the number of pulses 232 during refresh time $t_{refr}$ should be an integer multiple of the refresh rate, e.g., 6 or more pulses 232 per refresh time $t_{refr}$ (i.e., q=6). For better visualization, FIG. 8 illustrates the q pulses 232 delivered by projection light source 202 during each refresh time $t_{refr}$.

The number q is dictated by the angular velocity ω of rotating deflection unit 212. Synchronizing mechanism 230 adjusts the timing of output pulses 232 in coordination with angular velocity ω of unit 212 such that number q of pulses 232 delivered during each refresh time $t_{refr}$ is equal. The refresh time $t_{refr}$ is dictated by, among other things, the perception parameters of the human eye. The light valves 220 in each pixel generator $p_i$ in vertical line 218 have to respond sufficiently fast that the resulting pixels in the scanned image can be refreshed rapidly enough that the human eye does not perceive any appreciable image discontinuities. This condition determines the length of refresh time $t_{refr}$ given the number of lines of which the scanned image is composed.

In display systems with a large number of lines, e.g., on the order of 1,000 to 2,000 the appropriate refresh rate requires that passively Q-switched laser for the first and second light sources (green and blue) be set at a primary pulse repetition rate of at least 100 kHz.

The light source of the invention can also be used in image displays which are not scanned line-by-line but employ some different scanning procedure. It can also be used in display systems using as image generating pixels liquid crystals or micro-mirror arrays. In still another embodiment, the light source of invention can be used to illuminate a two-dimensional array of pixels generating an image in a non-scanned image display system. A person skilled in the art will appreciate that various multiplexing and scanning methods can be employed to operate such scanned and non-scanned display systems. Additionally, a person skilled in the art will recognize that the applications of the light source in a display system is only one of the many applications for this light source can be used.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A fiber amplifier system comprising:
   a pulsed laser configured to generate light pulses characterized by a pulse length $T_{pulse}$ and a repetition rate;
   a fiber amplifier optically coupled to the pulsed laser; and
   a nonlinear frequency converting element optically coupled to the fiber amplifier,
   wherein the pulse length $T_{pulse}$ is less than about 1.7 nsec and sufficiently large that a frequency bandwidth of the pulses after they emerge from the fiber amplifier is less than an acceptance bandwidth of the nonlinear frequency converting element;
   wherein the repetition rate is sufficiently large that amplified spontaneous emission in the fiber amplifier between pulses does not extract more than 50% of the total power from the fiber amplifier.

2. The fiber amplifier system of claim 1 wherein the repetition rate is greater than about 100 kHz.

3. The fiber amplifier system of claim 2 wherein the pulse length $T_{pulse}$ is greater than about 100 psec.

4. The fiber amplifier system of claim 2 wherein the pulsed laser is a passively Q-switched laser (PQSL).

5. The fiber amplifier system of claim 4, further comprising a PQSL pump source optically coupled to the PQSL.

6. The fiber amplifier system of claim 1, further comprising a fiber pump source optically coupled to the fiber amplifier.

7. The fiber amplifier system of claim 1, wherein the fiber amplifier is characterized by a figure of merit z that is greater than about 0.1, wherein z is given by $z=(0.037)\beta(dB/m) A_{mode}(\mu m^2)$, where $\beta(dB/m)$ is the absorption of the fiber amplifier in dB/meter and $A_{mode}$ is the mode area of light to be amplified by the fiber amplifier.

8. The fiber amplifier system of claim 7 wherein the figure of merit z is greater than about 0.5.

9. The fiber amplifier system of claim 7 wherein the fiber amplifier uses a cladding-pumped fiber with an air cladding.

10. The fiber amplifier system of claim 7 wherein the fiber amplifier includes a core of refractive index $n_c$, a depressed cladding of refractive index n' and an outer cladding of refractive index $n_{oc}$, wherein $n'<n_{oc}<n_c$.

11. The fiber amplifier system of claim 7 wherein the fiber amplifier has a core with an elliptical cross-section.

12. The fiber amplifier system of claim 7 wherein the fiber amplifier has a W-shaped refractive index profile characterized by a core with a refractive index $n_{core}$ and a radius $r_c$, a tunnel cladding surrounding the core, the tunnel cladding having a refractive index n' and a cladding region surrounding the tunnel cladding, the cladding region having a refractive index $n_{cl}$, wherein $n'<n_{cl}<n_{core}$ wherein the core is a single-mode core characterized by a cutoff V-number $V_{cl}$ greater than about 3.0, where $$V_{cl} = \frac{2\pi r_c}{\lambda_{cl}}\sqrt{n_{core}^2 - n_{cl}^2},$$

and where $\lambda_{cl}$ is a cutoff wavelength for a second mode of the core.

13. The fiber amplifier system of claim 1 wherein the fiber amplifier amplifies a primary signal having a wavelength ranging from about 860 nm to about 1100 nm.

14. The fiber amplifier system of claim 13 wherein the nonlinear element converts the primary signal to an output signal having a wavelength ranging from about 430 nm to about 550 nm.

15. An image projection system, comprising:
a pulsed laser configured to generate light pulses characterized by a pulse length $T_{pulse}$ and a repetition rate;
a fiber amplifier optically coupled to the pulsed laser;
a nonlinear frequency converting element optically coupled to the fiber amplifier;
an image generator optically coupled to the nonlinear frequency converting element; and
a scanner optically coupled to the image generator,
wherein the pulse length $T_{pulse}$ is less than about 1.7 nsec and sufficiently large that a frequency bandwidth of the pulses after they emerge from the fiber amplifier is less than an acceptance bandwidth of the nonlinear frequency converting element;
wherein the repetition rate is sufficiently large that amplified spontaneous emission in the fiber amplifier between pulses does not extract more than 50% of the total power from the fiber amplifier.

16. The image projection system of claim 15 wherein the pulsed laser is configured to generate light pulses at a repetition rate of greater than about 100 kHz.

17. The image projection system of claim 16 wherein the pulse length $T_{pulse}$ is greater than about 100 psec.

18. The image projection system of claim 16 wherein the pulsed laser is a passively Q-switched laser (PQSL).

19. The image projection system of claim 18 further comprising a PQSL pump source optically coupled to the PQSL.

20. The image projection system of claim 15 further comprising a fiber pump source optically coupled to the fiber amplifier.

21. The image projection system of claim 15 wherein the fiber amplifier is characterized by a figure of merit z that is greater than about 0.1, wherein z is given by z=(0.037) $\beta$(dB/m)$A_{mode}$($\mu m^2$), where $\beta$(dB/m) is the absorption of the fiber amplifier in dB/meter and $A_{mode}$ is the mode area of light to be amplified by the fiber amplifier.

22. The image projection system of claim 21 wherein the figure of merit z is greater than about 0.5.

23. The image projection system of claim 21 wherein the fiber amplifier uses a cladding-pumped fiber with an air cladding.

24. The image projection system of claim 21 wherein the fiber amplifier includes a core of refractive index $n_c$, a depressed cladding of refractive index n' and an outer cladding of refractive index $n_{oc}$, wherein $n'<n_{oc}<n_c$.

25. The image projection system of claim 21 wherein the fiber amplifier has a core with an elliptical cross-section.

26. The image projection system of claim 15 wherein the fiber amplifier amplifies a primary signal having a wavelength ranging from about 860 nm to about 1100 nm.

27. The image projection system of claim 26 wherein the nonlinear element converts the primary signal to an output signal having a wavelength ranging from about 430 nm to about 550 nm.

28. A light source comprising:
means for generating light pulses characterized by a pulse length $T_{pulse}$ and a repetition rate;
means for amplifying the light pulses; and
nonlinear means for frequency converting light pulses that have been amplified by the amplifying means,
wherein the pulse length $T_{pulse}$ is less than about 1.7 nsec and sufficiently large that a frequency bandwidth of the pulses after they emerge from the fiber amplifier is less than an acceptance bandwidth of the nonlinear frequency converting element;
wherein the repetition rate is sufficiently large that amplified spontaneous emission in the fiber amplifier between pulses does not extract more than 50% of the total power from the fiber amplifier.

29. For an apparatus having a fiber amplifier optically coupled to the pulsed laser; and a nonlinear frequency converting element optically coupled to the fiber amplifier, a method for optimizing the fiber amplifier, the method comprising:
determining a conversion efficiency $\delta(p)$ of the nonlinear frequency converting element as a function of a peak power of an input signal coupled into the fiber amplifier;
calculating an average power of output radiation B(z, p) from the nonlinear frequency converting element as a function of the peak power p and a figure of merit z, where z=(0.037)$\beta A_{mode}$, where $\beta$ is a rate of absorption of pump radiation by the fiber amplifier in dB/m, and $A_{mode}$ is a mode area of radiation to be amplified by the fiber amplifier in $um^2$, and where $$B(z, p) = \delta(p)\varepsilon P\left(1 - e^{-\frac{z}{p}}\right),$$

where $\epsilon$ is a conversion efficiency of the fiber amplifier, P is an average power of a pump radiation coupled into the fiber amplifier;
determining one or more best values $p_0$ of the peak power p for one or more corresponding values of z by solving $$\left.\frac{\partial B(z, p)}{\partial p}\right|_{p_0} = 0;$$

substituting the best values $p_0$ into $B(z, p)$ to determine one or more best values $B_{best}(z)$ of the average power of the output radiation from the nonlinear frequency converting element as a function of the figure of merit z determining a desired value $B_d$ of the average power of output radiation from the nonlinear frequency converting element from requirements of an application for which the apparatus is to be used;

from $B_d$ and the one or more values of $B_{best}(z)$ determining a minimum value $z_{min}$ of the figure of merit for the fiber; and from $z_{min}$ selecting a fiber amplifier characterized by values of $\beta$ and $A_{mode}$ such that for the fiber amplifier z is greater than or equal to $z_{min}$.

* * * * *